United States Patent
Horowitz

[15] 3,670,426
[45] June 20, 1972

[54] OPTICAL PROBE

[72] Inventor: Donald J. Horowitz, Santa Clara, Calif.
[73] Assignee: Lockheed Aircraft Corporation, Burbank, Calif.
[22] Filed: Aug. 17, 1970
[21] Appl. No.: 64,224

[52] U.S. Cl. .................................................35/12 N, 35/10.2
[51] Int. Cl. ..........................................B64g 7/00, G09b 9/08
[58] Field of Search.................35/12 N, 10.2; 178/DIG. 35, 178/7.81, 7.85, 7.92; 350/247

[56] References Cited

UNITED STATES PATENTS

| | | | |
|---|---|---|---|
| 3,275,743 | 9/1966 | Conant | 178/5.2 |
| 2,481,082 | 9/1949 | Chew | 350/247 X |
| 3,076,271 | 2/1963 | Marvin et al. | 35/12 N |
| 3,401,233 | 9/1968 | Hellings | 35/12 N X |
| 3,367,046 | 2/1968 | Neuberger | 35/12 N |
| 3,459,465 | 8/1969 | Rosin et al. | 35/12 N X |
| 3,052,753 | 9/1962 | Schwarz et al. | 35/12 N X |

Primary Examiner—Robert W. Michell
Assistant Examiner—L. R. Oremland
Attorney—Paul F. Morgan and George C. Sullivan

[57] ABSTRACT

An optical probe having simplified and optically improved means for obtaining movement of the field of view attitude and perspective. High light efficiency, optical resolution and depth of focus are provided, together with a substantial reduction in the number of optical and mechanical elements as compared to conventional visual flight simulation systems. A television camera has its field of view through a minor portion of the field of view of an extremely wide angle lens, and relative movement between the lens and the television camera provides a viewing attitude and perspective change without requiring tilting of the television camera or lens.

6 Claims, 9 Drawing Figures

INVENTOR.
DONALD J. HOROWITZ

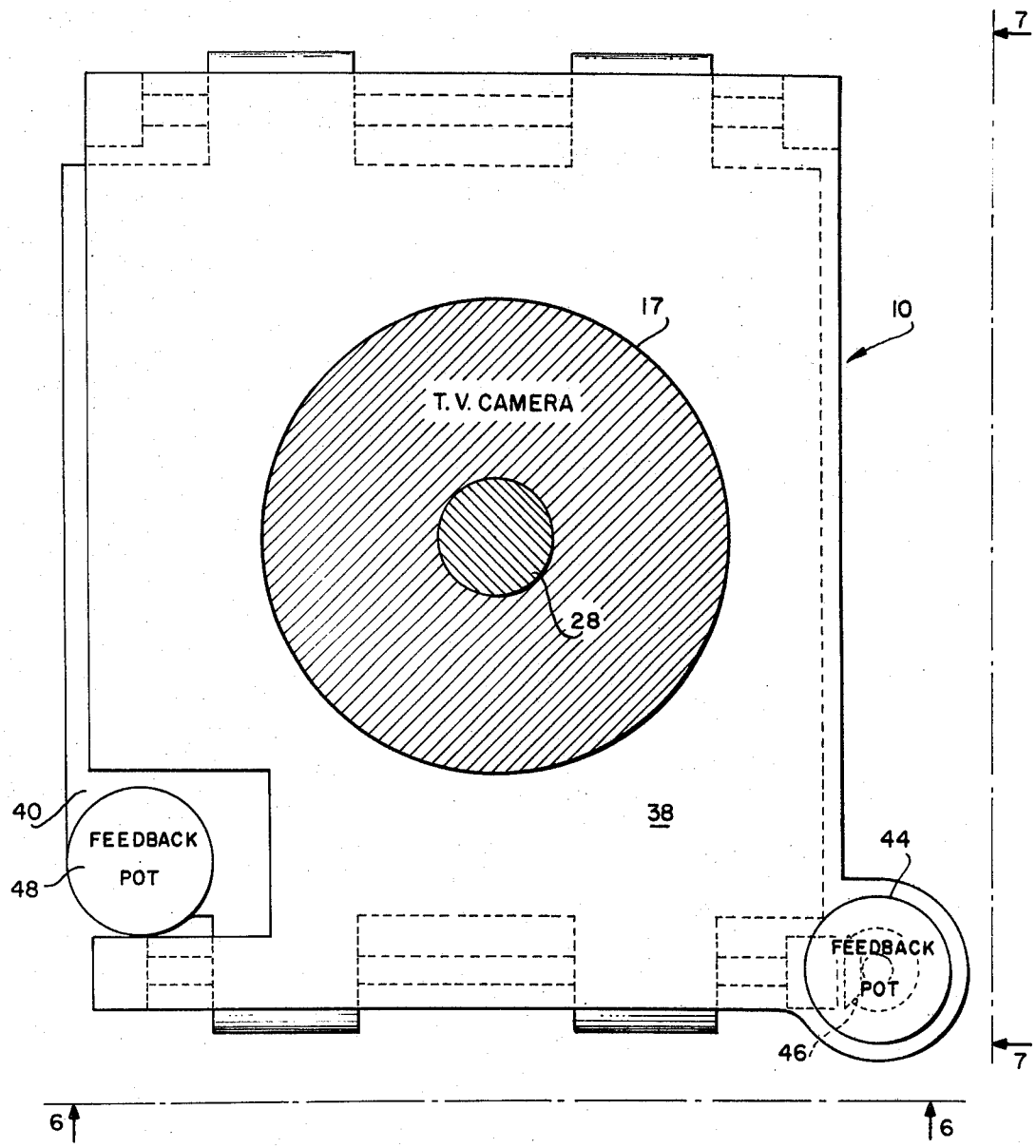
FIG_5

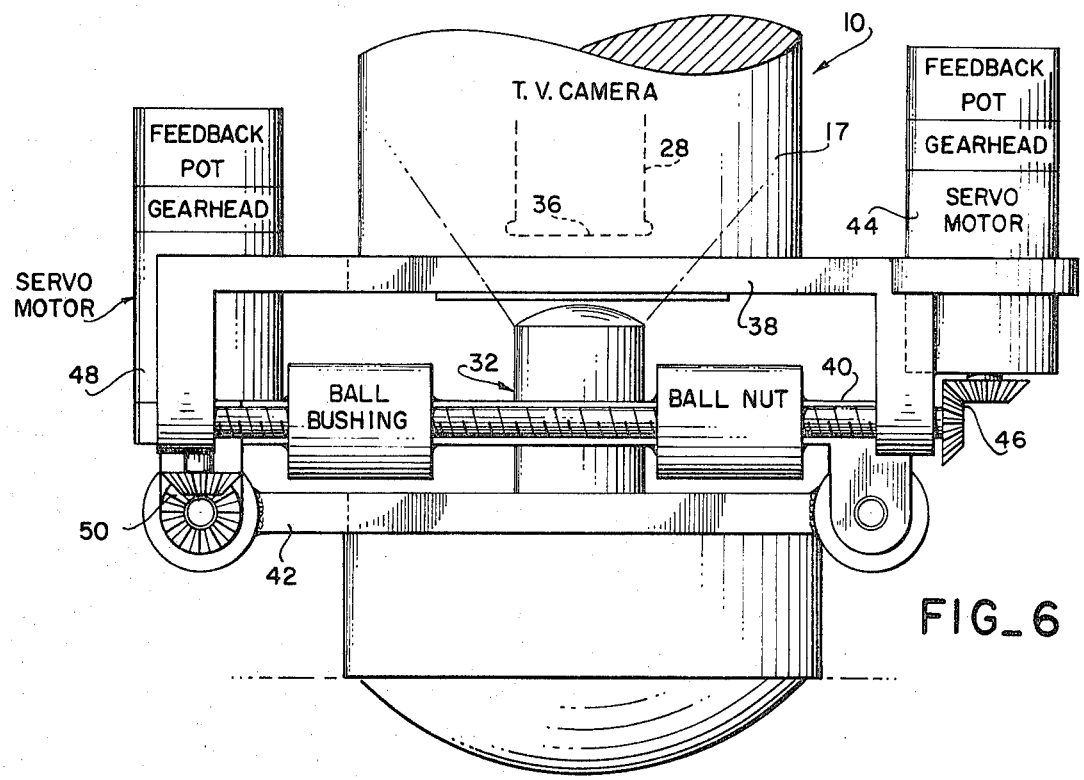
FIG_6
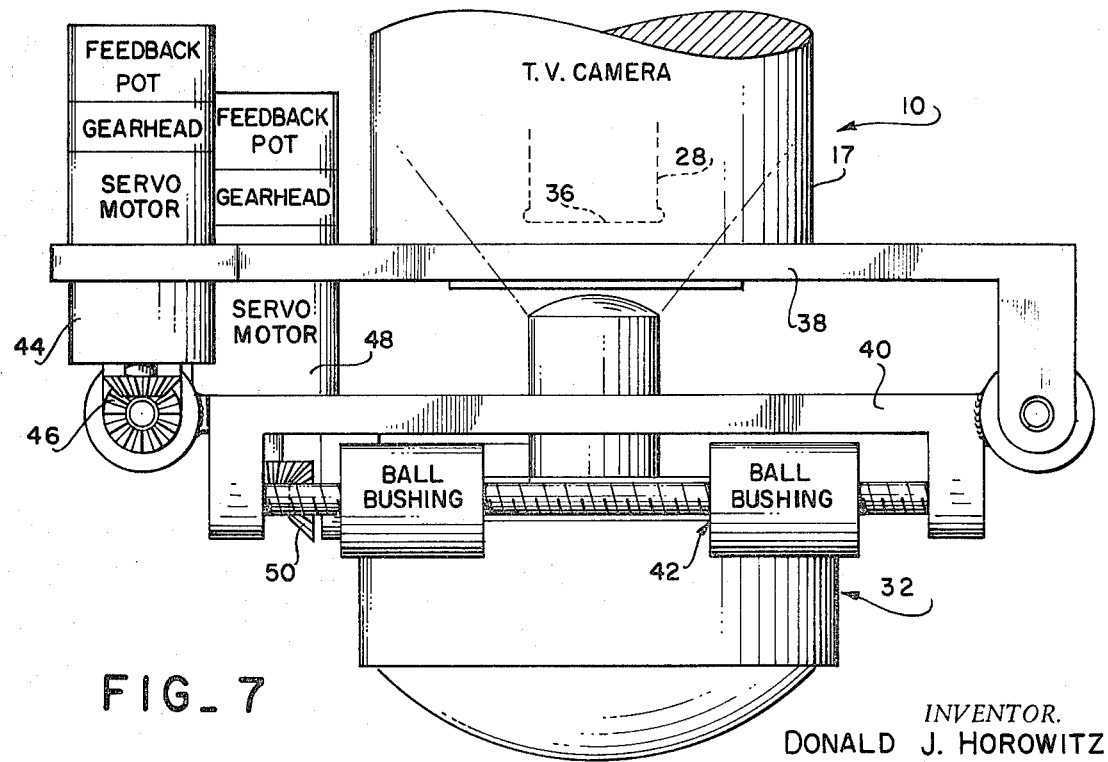
FIG_7

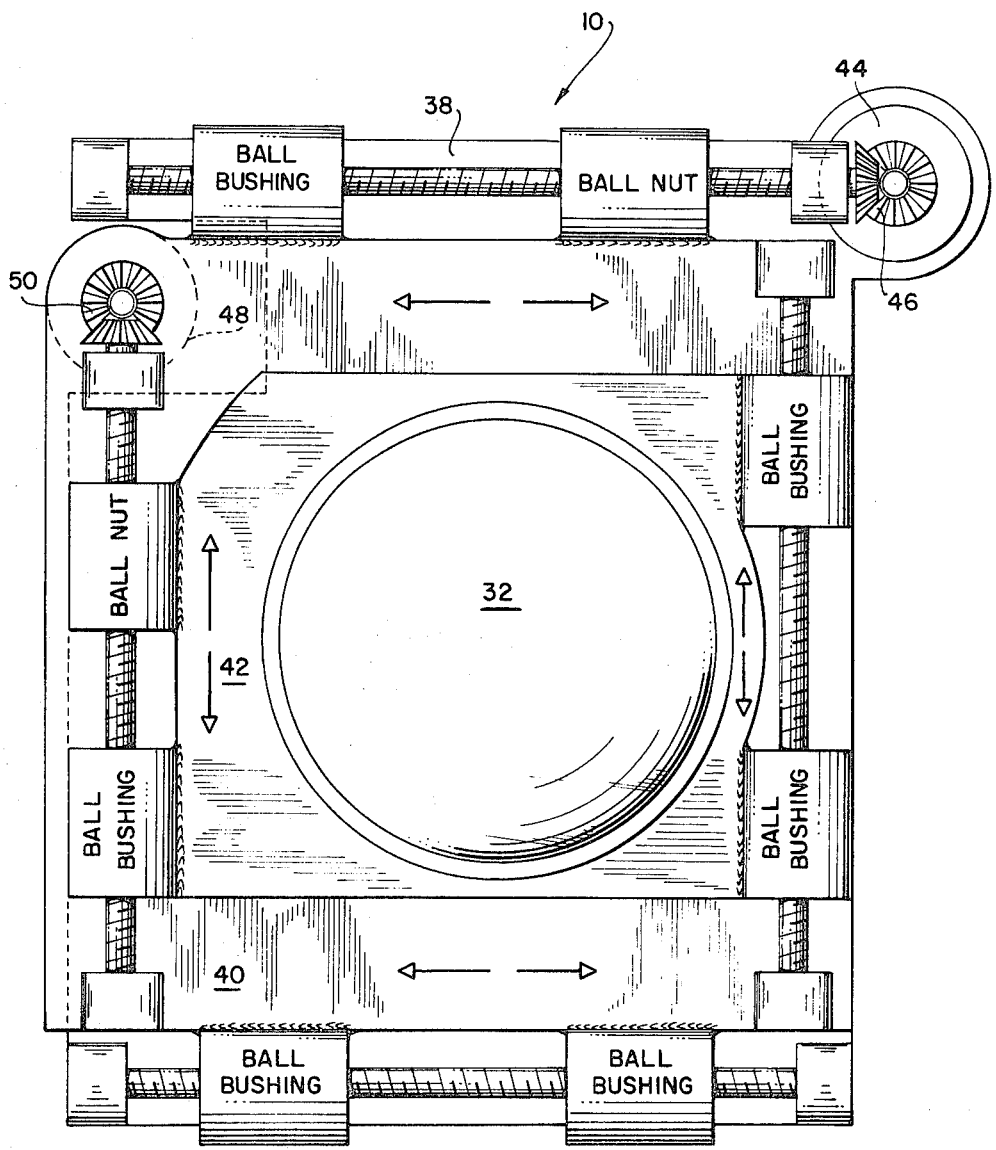
FIG_8

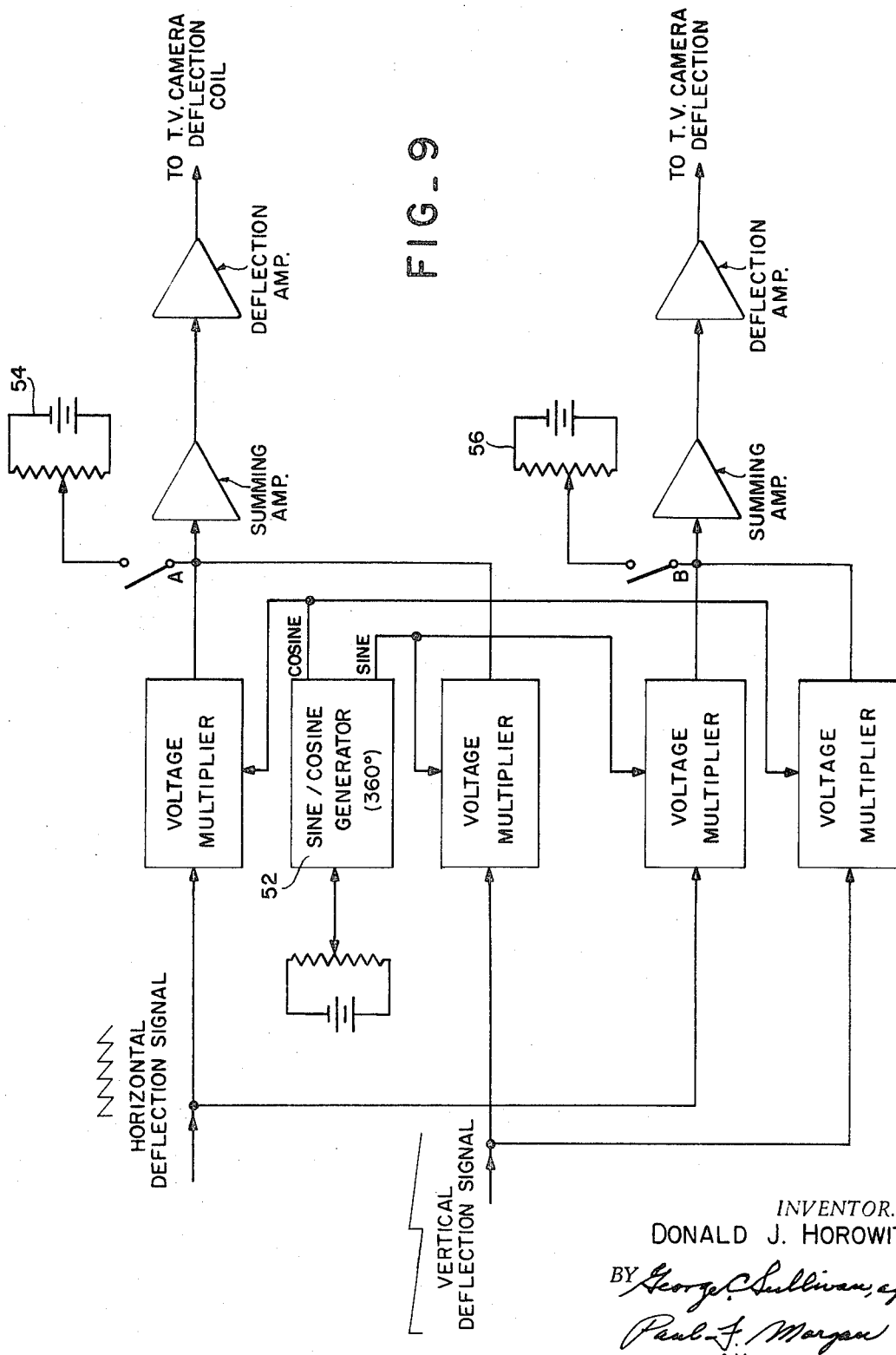
FIG_9

OPTICAL PROBE

The present invention pertains to an optical imaging apparatus providing movement of the field of view attitude and perspective by relative movement between a wide angle field of view lens and an optical image receiving surface which is adapted to receive only a selected minor portion of the optical image of the wide angle lens.

The necessary three degrees of attitude movement in flight simulation systems have been conventionally achieved by tilting the camera and/or lens system (optical probe) mechanically with respect to the terrain model. Such optical probes conventionally are constructed from a large number of moving optical elements with associated gears, bearings and other parts. Generally they sacrifice light efficiency for increased depth of focus. (The depth of focus problems associated with viewing a terrain model from very close but varying distances are quite critical.) The resulting low light efficiency requires expensive high intensity lighting with attendant cooling problems, restricts proper shadowing effects, and limits the use of color television. The following U. S. Pat. Nos. are illustrative of the prior art in this area: H. S. Hemstree, 2,975,671, Mar. 21, 1961, and 3,071,875, Jan. 8, 1963; P. L. Fox, 3,114,979, Dec. 24, 1963; T. P. Neuberger, 3,367,046, Feb. 6, 1968; N. E. Lamb, 3,371,432, Mar. 5, 1968; A. G. Barnes, 3,401,228, Sept. 10, 1968; G. M. Hellings, 3,401,233, Sept. 10, 1968; S. Rosin, et al, 3,459,465, Aug. 5, 1969; and A. Schwartz, et al, 3,052,753, Sept. 4, 1962. The above prior art patents illustrate the numerous different approaches which have been utilized in attempting to overcome the difficult optical and mechanical problems associated with flight simulation devices.

In contrast to the art cited above, the optical imaging apparatus described herein provides a greatly simplified visual flight simulating system with images of excellent fidelity requiring only minimal lighting of the terrain model and yet providing almost infinite depth of focus so that focusing mechanisms may be eliminated altogether. A single relatively inexpensive commercially available lens may be utilized. This extremely wide angle lens (often referred to as a "fish eye" lens) may be utilized directly in conjunction with properly dimensioned and positioned light image receiving surface as described herein. The light image receiving surface may be provided by a conventional vidicon, plumbicon, photographic film, or a direct optical viewing surface. A commercially available one inch vidicon television camera tube is shown in the specific embodiments described hereinbelow.

In the optical imaging apparatus described herein the three degrees of translational freedom (altitude and movement along both horizontal axes) may be conventionally provided by movement of the camera and lens with respect to the terrain model. But in contrast to the complex prior art mechanisms cited above, the three degrees of attitude freedom (pitch, roll and yaw), are not provided by a complicated electromechanical arrangement for tilting the camera and/or lens with respect to the terrain model. Rather, pitch and roll are provided by simple lateral translation of the lens relative to the camera in a single plane. This movement may be provided either mechanically or electronically. The relative movement between the light image receiving surface and the lens may be made electronically by movement of the raster electronically on the face of a vidicon tube, utilizing conventional techniques described herein in connection with FIG. 9 and exemplified by the circuits shown, for example, in U. S. Pat. Nos.: 2,490,561, 2,510,670, 2,774,964, 3,081,557, 3,181,140, 3,281,822, 3,336,497, 3,336,398, 3,491,200, 3,495,888, and 3,507,990. Roll may be conventionally provided by electronically rotating the television raster or by optically rotating the image by a dove or pechan prism rotated in the optical path. In the present system any translational and/or attitude movements may be made simultaneously and/or in any combination.

Further objects, features and advantages of the present invention pertain to the particular arrangement and structure whereby the abovementioned aspects of the invention are attained. The invention will be better understood by reference to the following description and to the drawings forming a part thereof, which are substantially to scale, wherein:

FIG. 5 illustrates in a detailed top view the optical imaging apparatus of FIGS. 1–4;

FIG. 6 is a side view of the exemplary optical imaging apparatus of FIGS. 1–5 taken along the line of 6—6 of FIG. 5;

FIG. 7 is an end view of the optical imaging apparatus of FIGS. 1-6 taken along the lines of 7—7 of FIG. 5;

FIG. 8 is a bottom view of the optical imaging apparatus of FIGS. 1–7; and

FIG. 9 is an electronic block diagram (schematic) of electronic circuitry for electronic raster rotation in the optical imaging apparatus of FIGS. 1–8. Also illustrated is additional circuitry for providing electronic horizontal and vertical movement of the raster area position and there by all electronic pitch and yaw as an alternative to the electro-mechanical system illustrated in FIGS. 5–8.

Figure 1:
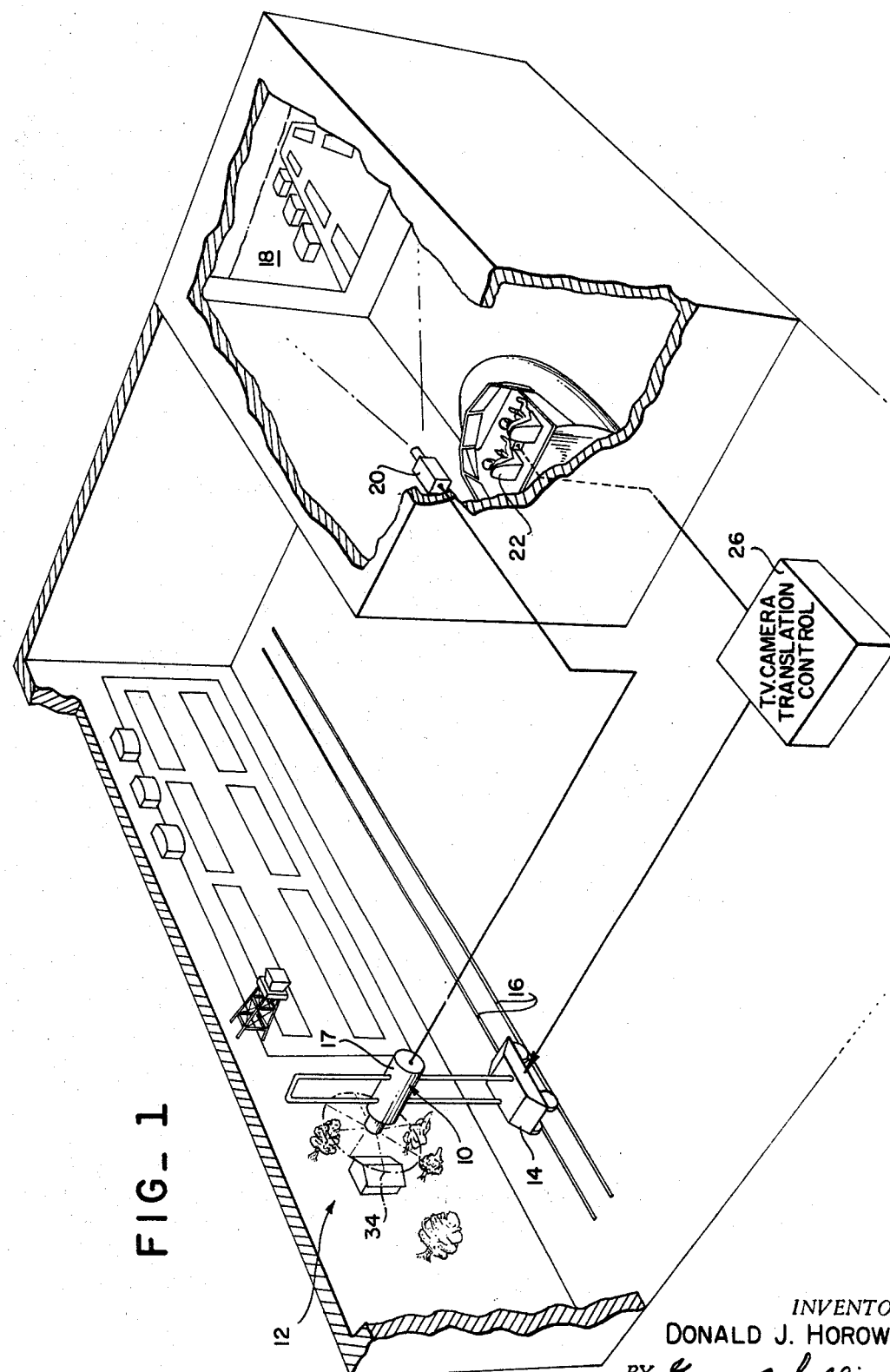
FIG. 1 is a perspective view of an exemplary visual flight simulation system incorporating optical imaging apparatus in accordance with the present invention.

Referring to the drawings, there is shown therein an exemplary optical imaging apparatus 10 providing movement of the field of view attitude and perspective in a visual flight simulating system. Referring in particular to FIG. 1, it may be seen that the optical imaging apparatus 10, which includes a television camera 17, is moveable with respect to a terrain model 12 on a moveable camera mount 14 which moves along a track 16. The television camera 17 provides an electronic image of the terrain model 12 which is electronically transmitted to a television projector 20 where it is projected on a projection screen 18 (or CRT monitor). There it is both visually observed and controlled by a pilot 22 in a flight simulator cockpit 24. This control by the pilot 22 of the optical imaging apparatus 10 is provided by feeding the pilot control movement back electronically through a TV camera translation control 26 to the camera mount 14. Both the camera mount 14 and the optical imaging apparatus 10 are controlled by a computer as a function of pilot inputs and the simulated dynamics of the particular vehicle being simulated. Other than the optical imaging apparatus 10, the above other components of the flight simulating system may be conventional, as shown for example in the above-cited U.S. Pat. No. 3,052,753. The present invention relates to the optical imaging apparatus 10 described in greater detail herein.

For purposes of convenience in the description of FIGS. 2–8 herein, it will be assumed that the optical axis of the lens 32 is vertical, viewing a horizontal terrain model beneath the lens. It will be appreciated, however, that the optical imaging apparatus 10 may actually be operated in any orientation, including that illustrated in FIG. 1.

Figure 2:
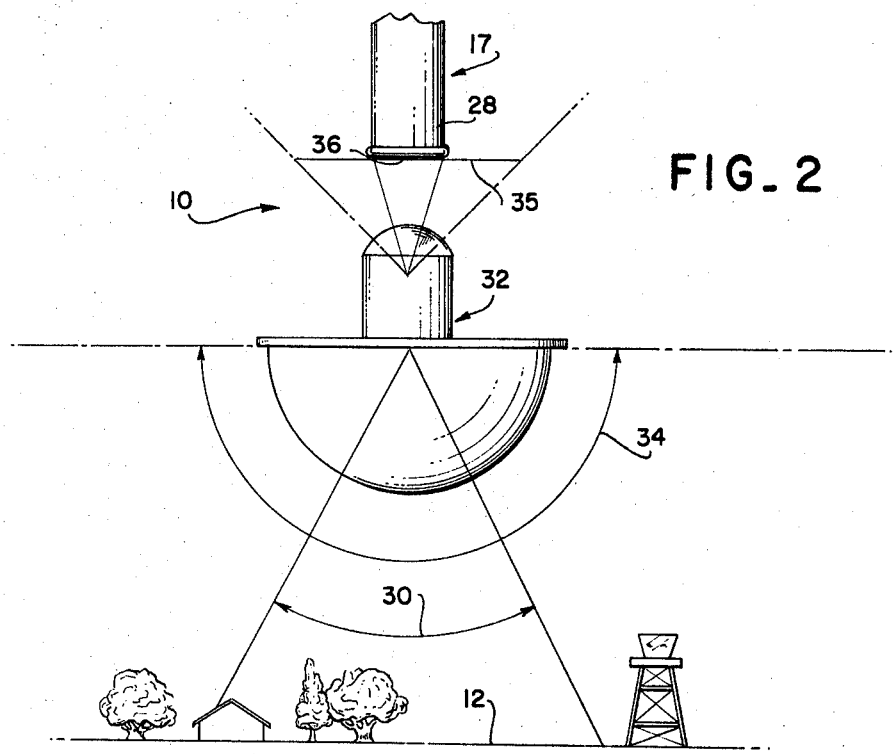
FIG. 2 is a simplified plan view of the exemplary optical imaging apparatus in FIG. 1 in which for clarity only the vidicon tube, the lens, and the terrain model are shown.
Figure 3:
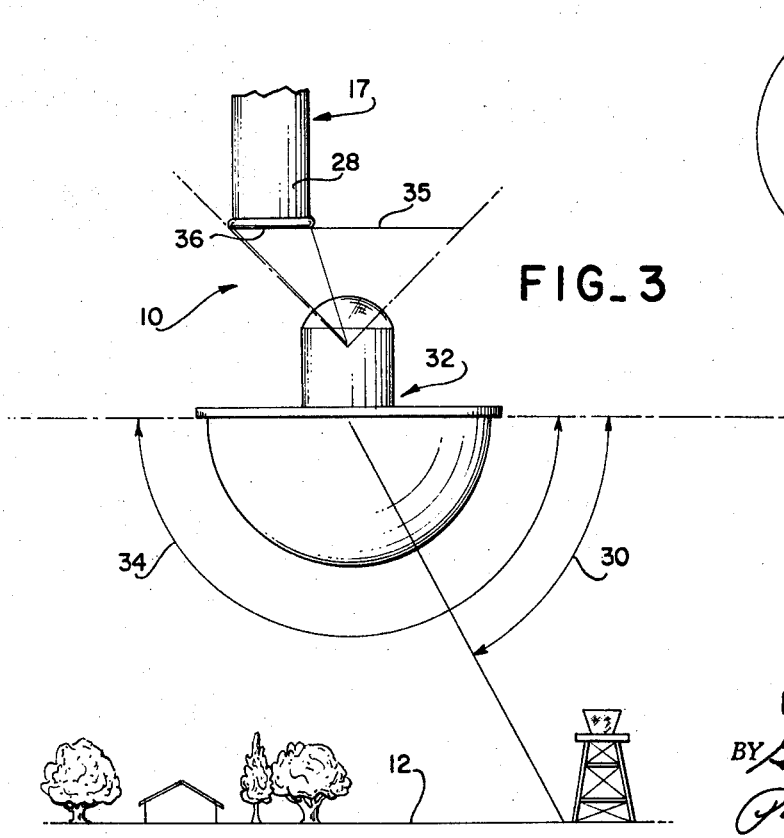
FIG. 3 is the same view as FIG. 2, illustrating the change in the field of view from FIG. 2 due to the translation of the lens with respect to the vidicon image surface.
Figure 4:
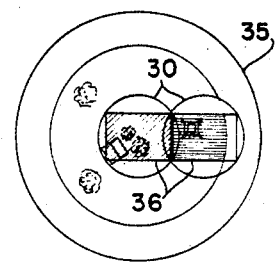
FIG. 4 illustrates in superposition the fields of view and optical images from FIGS. 2 and 3.

The basic details of the exemplary optical imaging apparatus 10 and its mode of operation may be very clearly seen in the simplified views of FIGS. 2–4. There is shown a conventional vidicon tube 28 having imaged upon it an angular field of view 30 (approximately 80°) of the terrain model 12, through an extremely wide angle objective lens 32; i.e., the lens 32 is optically interposed between the television camera 17 and the terrain model 12. The lens 32 itself has a full angular field of view 34 of approximately 180°. It may be seen that only that portion of the full angular field of view 34 of the lens 32 which is intercepted by the light image receiving surface area 36 of the vidicon 28 is viewed and transmitted at any one time. By the "light image receiving surface" 36 is meant that part of the light sensitive surface of the vidicon 28 which is transmitting an image, i.e., being scanned by its raster, and not necessarily the entire light sensitive surface (image frame area) of the vidicon.

The lens 32 is the only lens required in the entire system, in contrast to the complex lens system of the cited art. It is a modern, extremely wide angle lens, having an angular field of view of at least 170° to provide the necessary field of view coverage as well as sufficient perspective distortion. This perspective distortion (exaggeration) is utilized in the present system. The light image receiving surface area 26 of the vidicon 28 is located at all times in the focal plane of the lens 32, i.e., they are spaced apart by the focal distance of the lens 32. The lens 32 is selected so that its image area 35 (at its focal plane) is a selected ratio of the light image receiving surface area 36. This ratio is approximately 4 to 1 in area (2 to 1 in dimensions). It has been found that available 35 millimeter camera lenses with a greater than 170° field of view are directly compatible in the present apparatus (without masking) with commercially available 1 inch vidicons, which have approximately 16 mm size image frame area. This 16 mm size image is one-fourth the area of the lens' 35 mm image area size and therefore meets the desired 4 to 1 ratio. A specific example of an appropriate lens is the "fish eye" Nikkor lens for 35 mm cameras which has an $f$ 5.6 and a 7.5 mm focal length. A matching appropriate specific vidicon camera is the Fairchild TCS 950, which has a standard one inch vidicon. This capability for the use of commercially available components is obviously highly advantageous.

Referring again to FIGS. 2–4, it can be clearly seen that the field of view is "pitched-up" simply by lateral movement of the lens 32 with respect to the vidicon 28. In the "straight down" view of FIG. 2 the optical axis of the lens 32 is perpendicular the center of the light image receiving surface area 36 of the vidicon 28. Thus the vidicon 28 views only a central minor portion of the full image area 35 of the lens 32 (approximately one-quarter the area). The rest of the image of lens 32 is in effect "masked" at any given lens position. When the lens 32 is moved off-center, as in FIG. 3, a different minor portion of the lens image area 35 is viewed by the surface 36. The angular field of view of the vidicon through the lens 32 remains approximately 80° but is shifted to a different portion of the 180° field of view of the lens 32. Thus it may be seen that the lens 32 need only be driven in a linear plane in two axes parallel to the vidicon face to produce the visual effects of an attitude change on two axes, and thereby provide two degrees of attitude freedom in the resulting image. The total motion required to fully vary the image attitude is in the order of only one-half inch with the components discussed herein. This assists in simulating high rates of pitch and yaw change. A simple electromechanical servomechanism as shown and described in connection with FIGS. 5–8 may thus be utilized to provide all pitch and yaw changes, and the almost infinite depth of focus and high light efficiency of the lens may be fully utilized. It will be appreciated that the vidicon may be moved rather than the lens, if desired.

The field of view of the TV camera 17 may partially extend outside the field of view of the lens 32 whenever a portion of the light image receiving surface area 36 moves laterally outside of the image area 35 of the lens 32. (Corresponding to a pitch or yaw angle approaching the horizon.) However, this does not present a problem. The TV camera simply sees a dark area in the area outside the image area 35 of the lens. The flight simulation system, with this information (or the feedback information of the attitude angle), can project light in this dark area from the TV projector 20 to simulate sky light. Such techniques are conventional, as illustrated for example in the referenced U.S. Pat. No. 3,507,990.

Referring now particularly to FIGS. 5–8, there is illustrated therein an exemplary electromechanical arrangement for achieving optical simulation of pitch and yaw in the optical imaging apparatus 10. There is shown an exemplary servomotor driven dual moving platform arrangement for providing the desired single plane two-axis lens movement described above. (The components will, of course, normally be enclosed by an external shield, with only the lens opening exposed. For clarity here this shield is not shown.)

As clearly seen in the side and end views (FIGS. 6 and 7) the TV camera 17 with the vidicon 28 therein is mounted to a fixed platform 38. The light image receiving surface area 36 views the selected portion of the image of the lens 32 (though an aperture in the fixed platform 38) as described above in connection with FIGS. 2–4. Mounted underneath the fixed platform 38 for movement on one horizontal axis is an upper moving platform 40. A lower moving platform 42 is in turn mounted beneath (and to) the upper moving platform 40 for movement on the opposite (perpendicular) horizontal axis. The lens 32 is mounted to this lower moving platform 42, and thus is moveable on both horizontal axes by selected movements of the upper and lower moving platforms 40 and 42.

All of the disclosed exemplary components for this movement of the platform 40 and 42 may be conventional commercially available hardware items and accordingly need not be described in detail herein. The upper moving platform 40 here is driven by an upper servomotor 44 through a first bevel gear set 46. The lower moving platform 42 is separately driven by a lower servomotor 48 through a second bevel gear set 50. Both servomotors include integral gearheads and feedback pots (or other feedback devices.) The upper servomotor 44 is mounted on the fixed platform 38 while the lower servomotor 48 is mounted on (and moves with) the upper moving platform 42.

As may be seen in the top view of FIG. 5, clearance is provided in the fixed platform 38 for the movement of the lower servomotor 48. Conventional feedback arrangements may be provided through feedback potentiometers associated with the servomotors (as shown) for connection through the TV camera translation control 26 with the pilot controls in the flight simulator. The mounting of the moving platforms 40 and 42 here is by the cylindrical rods shown at opposite sides thereof. The platforms slide on the ball bushings over these rods and are positioned by the ball nut on each platform engaging threads on the rods. One rod for each platform is rotated by its respective servomotor through a bevel gear set to drive the platform. This arrangement is, of course, merely exemplary, as numerous other electromechanical arrangements may be utilized to achieve the same desired limited two axis single plane movement of the lens 32 with respect to the TV camera 17.

It will be noted that the lens 32 outer glass is the lowermost extreme extension of the optical imaging apparatus 10. I.e., there is no part of the mechanism which extends beyond the lens 32. This is advantageous in that the lens can be moved as closely as desired to the terrain model without interference.

Referring now to FIG. 9, there is shown therein a generally conventional electronic technique, using conventional circuit components, for providing "roll", i.e., image rotation about the axis of the lens 32 and the TV camera 17. (It will be appreciated, as previously discussed, that other conventional optical means for image rotation may be provided.) In the circuit of FIG. 9 the conventional horizontal and vertical deflection signals for the TV camera 17 are applied as shown, and are used to conventionally provide a raster square in the vidicon 28 through deflection amplifiers and the TV deflection coils as shown. These signals are combined with the output of a conventional voltage controlled sine/cosine generator 52 in voltage multipliers to electronically rotate the raster. This is a standard electronic technique for rotation of the raster.

The additional circuits 54 and 56 which may be switched into the circuit of FIG. 9 at points A and B provide an additional function. They provide an adjustable superimposed DC offset bias voltage for moving the position of the entire raster square electronically within the vidicon. This circuitry may be used where it is desired to have an all electronic optical imaging apparatus which does not require any mechanical lens movement, i.e., the electromechanical lens movement of FIGS. 5–8 is eliminated and replaced by this circuitry. Pitch and roll are provided in this manner electronically by moving the light imaging receiving surface 36 in the vidicon 28 rather than by moving the lens 32. The raster square is electronically shifted in position within the imaging tube by the offset voltage provided at points A and B by the circuits 54 and 56. This provides the necessary relative movement between the light image receiving surface area 36 and the lens 32. This, of course, requires a larger vidicon tube since the raster area can occupy only a portion of the vidicon image surface (frame area) at any given moment. However, since the total motion required is small, this does not present any particular problem.

In conclusion, it may be seen that there has been described herein a novel and approved imaging apparatus having numerous advantages in both structure and operation. The exemplary embodiments described herein are presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. In a visual flight simulating system wherein a terrain model is variably viewed by a television camera and wherein the image of said terrain model received by an imaging surface in said television camera is fed to and projected in a flight simulator and wherein the flight simulator contains means for feedback signals representative of desired changes in attitude of the view from said television camera of said terrain model, the improvement comprising:

an extremely wide angle field of view lens optically interposed between said television camera and said terrain model;

said television camera having an angular field of view through said lens of said terrain model limited to only a portion of the wide angle field of view of said lens;

and servo means controlled by said feedback signals from said flight simulator for moving said lens relative to said television camera in a plane substantially parallel to said imaging surface of said television camera to make a viewing attitude and perspective change of said terrain model without tilting said television camera or lens with respect to said terrain model.

2. The visual flight simulating system of claim 1 wherein said lens has an angular field of view of approximately 180° and said television camera has an angular field of view through said lens of approximately 80°.

3. In a visual flight simulator wherein a terrain model is variably viewed by a light image receiving means, and wherein the image of said terrain model is received by a light image receiving surface in said light image receiving means and projected in the flight simulator and wherein the flight simulator contains means for making desired changes in attitude of the view from said light image receiving means of said terrain model, the improvement in optical imaging apparatus providing movement of the field of view attitude and perspective comprising:

a lens having en extremely wide angle field of view about an optical axis;

light imaging receiving means for receiving an image of a selected viewing area on a light image receiving surface therein, said light image receiving means having an effective angular field of view extending through said wide angle field of view lens;

said lens being optically interposed between said light image receiving means and said terrain model;

said effective angular field of view of said light image receiving means through said wide angle field of view lens being limited to only a selected minor angular segment of said wide angle field of view;

and means for relative movement between said light image receiving surface and said wide angle field of view lens transversely of said optical axis of said wide angle field of view lens to make a viewing attitude and perspective change at said light image receiving surface without tilting said light image receiving means.

4. The optical imaging apparatus of claim 3 wherein said light image receiving means is a television camera;

and wherein said wide angle field of view lens is optically mounted in front of said light image receiving surface of said television camera and focuses an image in the plane of said light image receiving surface with an area substantially greater than the area of said light image receiving surface.

5. In a visual flight simulator wherein a terrain model is variably viewed by a light image receiving means, and wherein the image of said terrain model is received by a light image receiving surface in said light image receiving means and wherein the flight simulator contains means for making desired changes in attitude of the view from said light image receiving means of said terrain model, the improvement in optical imaging apparatus providing movement of the field of view attitude and perspective comprising:

a lens having an extremely wide angle field of view about an optical axis and focusing an optical image of a given area of said wide angle field of view at an image plane;

television means having an angular field of view through said lens;

said television means having a light image receiving surface area positioned at said image plane of said lens but occupying only a selected minor portion of said given area of said optical image of said lens for receiving only a selected minor segment of said wide angle field of view of said lens;

and means for moving said selected minor segment of said wide angle field of view by relative movement between said light image receiving surface area of said television means and said lens transversely of said optical axis of said lens to make a viewing attitude and perspective change at said light image receiving surface.

6. The optical apparatus of claim 5 wherein said light image receiving surface area of said television means is approximately one-fourth said given area of said optical image of said lens.

* * * * *